UNITED STATES PATENT OFFICE.

ELLERT ANDREAS WALLENDAHL DAHL, OF NEW YORK, N. Y., ASSIGNOR OF ONE-HALF TO JOHN NEEDHAM LONGDEN, OF SAME PLACE.

MARINE PAINT.

SPECIFICATION forming part of Letters Patent No. 389,875, dated September 25, 1888.

Application filed October 19, 1887. Serial No. 252,791. (No specimens.)

*To all whom it may concern:*

Be it known that I, ELLERT ANDREAS WALLENDAHL DAHL, a subject of the King of Norway, residing at the city of New York, in the county of New York and State of New York, have invented certain new and useful Improvements in Marine Paint, of which the following is a specification.

My invention has for its object the making of a marine paint one of the ingredients of which is metallic copper.

After metallic copper is precipitated in fine particles from solution of a salt of copper it holds or retains, by capillary attraction or otherwise, a large portion of water. In order to get rid of this water without oxidation of the metallic copper, I place the metallic copper, after precipitation, in a vessel and add to it a vehicle composed of tar diluted to a proper consistency with benzine, turpentine, or creosote. I then stir the mass slowly, when the particles of copper gradually become coated with the vehicle, and the water held by the particles leaves them, and, having no affinity for the vehicle, becomes separated therefrom and is poured or drained from the vessel. When the temperature of the room in which the mixing takes place is low, I find that the operation is much facilitated by adding resin previously dissolved in its solvents, such as benzine or turpentine. The quantity of the resin solution which I find produces the best results varies with the temperature; but it is about one-third the volume of the vehicle.

The tar which I prefer is wood-tar; but I can use coal-tar, in which case resin is more necessary; or I can use both kinds of tar mixed.

After the water has been separated and removed, as above described, I add benzine or turpentine to make the mixture of any desired consistency, and it is then ready for use. If desired, it can be mixed with any desired color or with substances such as French ocher or Venetian red, which, besides giving a color to the mixture, will retard the solution thereof by the action of the salt-water.

What I claim as new, and desire to secure by Letters Patent, is—

1. In the manufacture of a marine paint containing metallic copper in fine particles, the process of separating the water held by the particles after their precipitation, which consists of mixing the particles with tar sufficiently liquid to allow the water to separate and removing the water, all substantially as described.

2. A composition of matter composed of metallic copper in fine particles and tar, all substantially as described.

3. A composition of matter composed of metallic copper in fine particles, tar, and benzine, all substantially as described.

ELLERT ANDREAS WALLENDAHL DAHL.

Witnesses:
  HENRY ARDEN,
  J. N. LONGDEN.